United States Patent Office 3,490,733
Patented Jan. 20, 1970

3,490,733
VALVE OPERATING DEVICE
Jean Berthaud, Pont Saint Esprit, France, assignor to Commissariat a l'Energie Atomique, Paris, France
Filed July 8, 1968, Ser. No. 743,113
Claims priority, application France, July 21, 1967, 115,213
Int. Cl. F16k *31/12;* F01b *19/00;* F16j *3/00*
U.S. Cl. 251—58                      6 Claims

ABSTRACT OF THE DISCLOSURE

A rotary plug valve operating device comprising two flexible pipe-sections, each section being connected at one end to a closed tubular member which is capable of rotating freely about its own axis and which is secured externally to an operating fork for effecting the radial displacement of a lever which is coupled to the valve plug and at the other end of a tube element which is rigidly fixed in position on a stationary support and associated with the corresponding flexible pipe-section after this latter has been twisted through a predetermined angle, and a duct for the controlled admission of a compressed fluid into said flexible pipe-section, the twisting movements imparted to the two flexible pipe-sections being equal and in opposite directions.

---

This invention relates to a pneumatic operating device which permits the remote operation of a valve gate or plug, specifically in the case of valves of the so-called quarter-turn type in which the change-over of the valve plug from the open position to the closed position or conversely is carried out as a result of the rotation of a rod or control lever through an angle of approximately 90°.

In plants which comprise different circulation systems or which have a network of complex piping, it is frequently useful to be able to place the control devices for opening and closing the valves which are distributed over said network at locations in which circulation-system control operations are centralized. Grouping of control devices is practically indispensable in the particular case in which valves are either inaccessible or hard to reach by reason of their localization in circulation systems or by reason of the potential hazards presented either by the nature of the fluids which flow through said circulation systems or by the surrounding atmosphere (toxic or radioactive products).

In conventional solutions, the remote operation of valves is carried out by means of pneumatic or electric mechanisms, especially of the type consisting of jacks or motors which are coupled to the rods or levers of the valve plugs by means of reduction-gear units in the case of motors or, in the case of jacks, by means of ancillary devices which transform the movement of said jacks into a movement of rotation. Furthermore, in the case of drive motors, the cut-off devices must be designed to stop said motors in the end positions of the valve-operating levers, use being made of torque-limiting devices in order to prevent any damage which is liable to occur as a result of abnormal stresses or faulty operation of said cut-off devices. Aside from their high cost price which arises from the nature of the materials employed, all of these devices call for very careful machining, especially in the case of nuclear plants in which contamination hazards are also to be taken into consideration.

The present invention is directed to a device for operating a rotary plug valve which circumvents the disadvantages referred-to above by virtue of a very simple arrangement which does not call for any machining, which can readily be changed and which affords excellent resistance to corrosion combined with a high standard of operational safety.

To this end, said device of the type comprising at least two sections of flexible pipe is characterized in that each of said sections is connected at one end to a closed tubular member which is capable of rotating freely about its own axis and which is secured externally to an operating fork for effecting the radial displacement of a lever which is coupled to the valve plug and at the other end to a tube element which is rigidly fixed in position on a stationary support and associated with the flexible pipe-section after said section has been twisted through a predetermined angle, a duct through which compressed fluid is admitted into said flexible pipe-sections, the twisting movements imparted to the two flexible pipe-sections being equal and in opposite directions.

In a preferred embodiment of the invention, the two flexible pipe-sections are connected to the same closed tubular element and disposed in the line of extension of each other in order that the fork which is rigidly fixed to said tubular element may be caused to rotate in alternate sequence in one direction then in the other by admission of compressed fluid into each pipe section.

However, in other embodiments, the two flexible pipe-sections are disposed side by side parallel to the axis of the valve plug and each associated with a closed tubular member which is rigidly fixed to an operating fork so that the rotation of the valve plug may be controlled separately.

The valve operating device according to the invention thus makes use of the torque which is generated by admission of a compressed fluid into each flexible and leak-tight pipe-section which has previously been twisted about its own axis and returns to its normal position under the action of the pressure of the fluid while initiating the radial displacement of the valve-plug operating lever in the corresponding direction.

As an advantageous feature, the flexible pipe-sections are fabricated from a reinforced synthesis elastomer material in the form of a thin-walled flexible tubular element which is capable of withstanding high pressures while affording effective resistance to wear and ageing, to high temperatures, to chemical agents and to bending. Preferably, a tubular element of this type is formed of a material which is known by the name of "Plastidry" (registered trademark) consisting of a synthesis elastomer such as nitrile rubber reinforced with threads of an adipic acid polycondensate and hexamethylenediamine or "Nylon" (registered trademark) and protected by an external polyvinyl sheath, a material of this type being normally capable of withstanding pressures of the order of 30 to 40 bars and of lending itself to over 100,000 twisting movements without exhibiting defects of leak-tightness.

The invention will in any case be explained in greater detail in the following description of one exemplified embodiment which is given by way of indication and not in any limiting sense.

Figure 1:
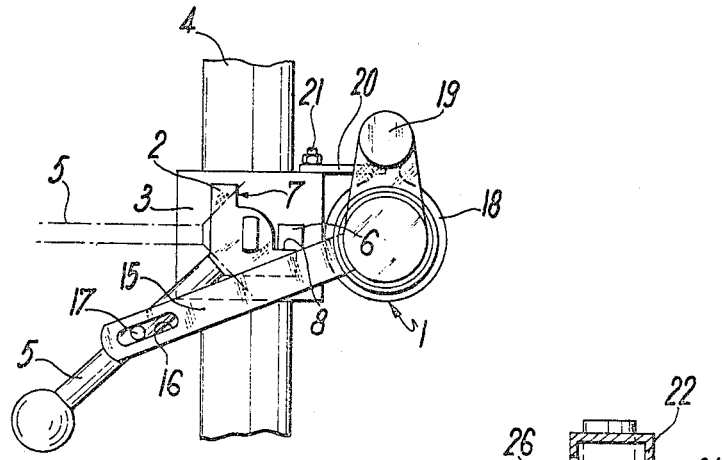
FIGS. 1 and 2 are respectively a top view and a vertical sectional view of a pneumatic valve-operating device as constructed in accordance with the invention.
Figure 2:
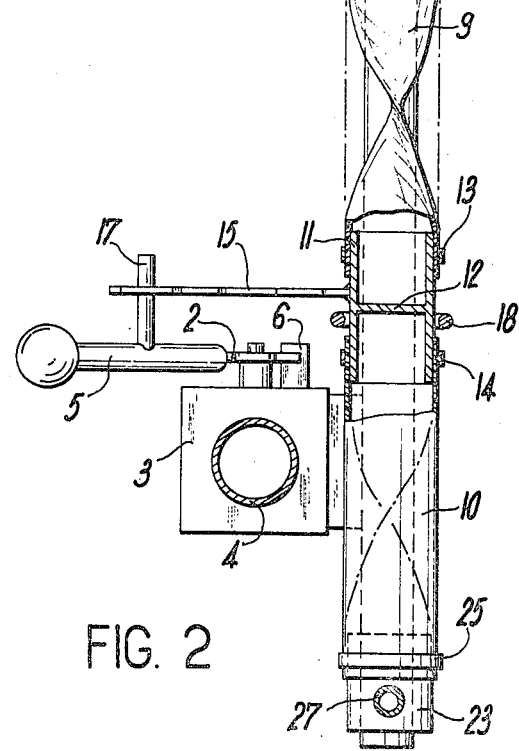

It is apparent from FIGS. 1 and 2 that the device under consideration which is generally designated by the reference numeral 1 is intended to initiate the opening or closure of the plug 2 of a valve 3 which is placed in a pipe 4 for the circulation of any fluid. The plug 2 is connected externally of the valve body 3 to an operating lever 5 whose rotational motion is accompanied by that of the valve plug and either permits the closure of this latter or provides a free and unobstructed passageway for the fluid which is circulated within the pipe 4. The movement of the valve plug is limited between two end positions corresponding exactly to the opening and closure of the valve by means of a stop 6 which is provided on the valve body 3 and adapted to cooperate with two bearing surfaces 7 and 8 of the plug which are in oppositely-facing relation to said stop.

In accordance with the invention, the device for the pneumatic control of the plug 2 is constructed by means of two pipe-sections 9 and 10 formed of a suitable leak-tight and flexible material such as in particular "Plastidry" (registered trademark). These two flexible pipe-sections are joined together by means of a tubular element 11 having a diameter which is substantially equal to that of the pipe-sections 9 and 10 and a base 12 which stops the flow from one pipe-section to the other. The tubular element 11 is rigidly fixed to said pipe-sections 9 and 10 by means of fastening-collars 13 and 14. A fork 15 is fixed on the outer surface of said tubular element and provided at the extremity thereof with an elongated slot 16, a pin 17 which is integral with the lever 5 being adapted to penetrate into said slot and to transmit to said lever the movement of radial displacement of the fork 15 in the same plane which is carried out as a result of the movement of rotation of the tubular element 11 about its axis. During this movement, the tubular element 11 is guided axially by means of a ring 18 which is rigidly fixed to a support 19, said support being fixed in position with respect to the valve casing 3 by means of brackets 20 which are secured by means of nuts 21.

At each end which is remote from the tubular element 11, the flexible pipe-sections 9 and 10 are respectively fastened to two end-caps 22 and 23 which are designed in the form of closed tube elements, said end-caps being joined to the flexible pipe-sections by means of fastening-collars 24 and 25 which are similar to the fastening-collars 13 and 14. Said collars 24 and 25 serve to secure the end-caps 22 and 23 with respect to the support 19, with the result that the corresponding extremities of the flexible pipe-sections 9 and 10 are fixed in position. At the time of assembly, said pipe-sections are subjected to a twisting movement about their own axes through a predetermined angle which, in the example under consideration, is equal to approximately 90° before their extremities are immobilized with respect to the end-caps 22 and 23, this twisting movement being performed in the case of each pipe-section 9 and 10 in the opposite direction with respect to the other. Finally, openings 26 and 27 are formed in the end-caps 22 and 23 and provide a communication between said flexible pipe-sections and external ducts (not shown in the drawings) which serve to admit a compressed fluid at a suitable pressure and to ensure the operation of the device.

The operation is carried out as follows: in the initial position which is illustrated in chain-dotted lines in FIG. 1, the lever 5 which serves to operate the plug 2 is placed substantially in the mean position which it is capable of taking up between the end positions defined by the stop 6 and the bearing surfaces 7 and 8. In this initial position, the flexible pipe-sections 9 and 10 are subjected to twisting movements of the same amplitude but in opposite directions which are substantially balanced. In consequence, the admission of compressed fluid through the opening 27 into the flexible pipe-section 10 produces within this latter a pneumatic force which acts in opposition to the torsion of the flexible pipe-section and actuates the tubular element 11 together with the fork 15 which is rigidly fixed thereto in the corresponding direction until the lever 5 which is displaced by the pin 17 comes up against the stop 6 (as shown in the figures). At the same time, this rotational motion of the fork 15 produces in the case of the other flexible pipe-section 9 a torsion which is double the torsion to which it was initially subjected (as shown in FIG. 2), the opening 26 being in free air and therefore enabling the flexible pipe-section 9 to follow the movement imposed. During said movement, the ring 18 guides the tubular element 11 while the pin 17 moves at the same time with respect to the elongated slot 16 by reason of the compensated changes in length of the flexible pipe-sections 9 and 10 which result from the variation in their respective torsion.

As will be readily apparent, the operation of the plug 2 in the opposite direction is carried out symmetrically in reverse by relieving the pressure of compressed fluid on the flexible pipe-section 10 while at the same time directing an equivalent pressure into the pipe-section 9 through the opening 26; the twisting motion of the pipe-sections then takes place in the opposite direction.

Figure 3:
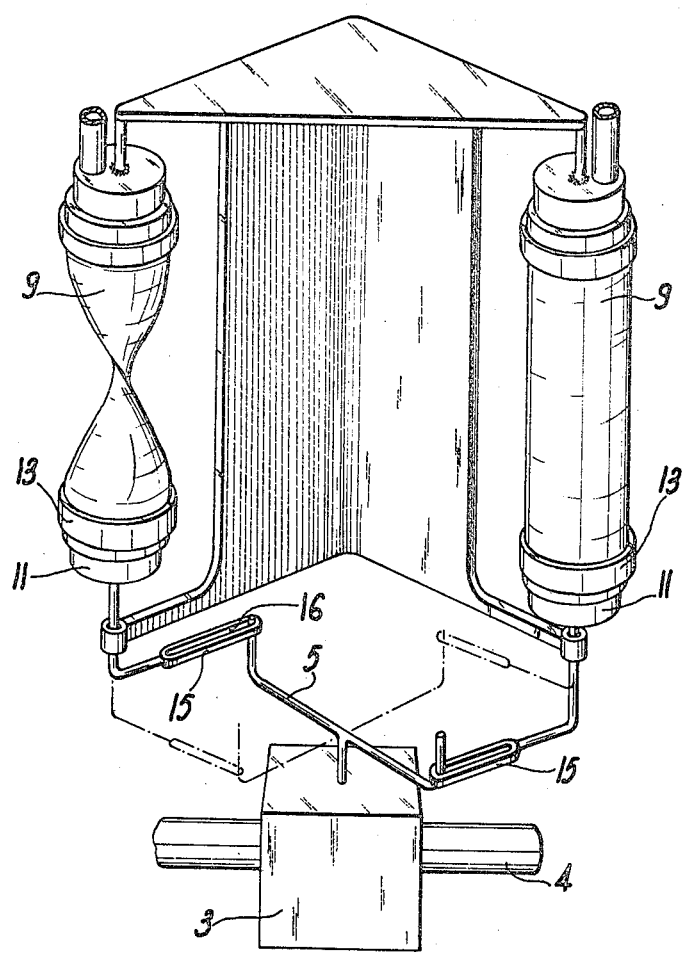
FIG. 3 is a general arrangement diagram of another alternative embodiment.

Further alternative forms of construction could naturally be contemplated. In particular and as is illustrated in the diagram of FIG. 3, the two flexible pipe-sections 9 could be arranged side by side by associating them with two tubular elements 11, the two forks 15 of which would in turn displace the operating lever 5 of the valve 3 first in one direction then in the other, each flexible pipe-section being alternatively put under pressure in exactly the same manner as was described with reference to FIG. 2 so that the twisting motion of the other flexible pipe-section is caused to take place in the opposite direction and through an equal angle. It should be noted that, in all cases, the angle of initial torsion of each pipe-section must be chosen so as to be slightly larger than that of the radial displacement of the operating lever as a result of the reduction produced by the transmission of motion by means of the fork and the driving pin of the lever.

There is thus provided an operating device which can be considerably reduced in cost price by virtue of the simple use of flexible pipe-sections which do not call for any machining operations, which are endowed with an appreciable resistance to chemical corrosion and do not entail the use of any bearing. The torsional angles and angles of rotation can be of any desired value; in addition, the active portion of the device can readily be changed since it is only necessary to unscrew the nuts which serve to couple the stationary support to the valve casing in order to remove the apparatus entirely.

The device which has been considered affords in addition a high degree of operational safety by virtue of the possibility of making use of high driving pressures of a wide range of different fluids, especially in the case of abnormal resistances: if pressures of the order of a few bars in fact prove sufficient for normal operation, the nature of the flexible pipe-sections permits the utilization of considerably higher pressures if necessary. Finally, said device has a good progressivity, the driving torque created being of maximum value at the outset in order to decrease with the torsional angle at the end of operation.

What I claim is:

1. A device for operating a rotary plug valve and comprising at least two flexible pipe-sections, characterized in that each of said sections is connected at one end to a closed tubular member which is capable of rotating freely about its own axis and which is secured externally to an operating fork for effecting the radial displacement of a lever which is coupled to the valve plug and at the other end to a tube element which is rigidly fixed in position on a stationary support and associated with the flexible pipe-section after said section has been twisted through a predetermined angle, a duct through which compressed fluid is admitted into said flexible pipe-sections, the twisting movements imparted to the two flexible pipe-sections being equal and in opposite directions.

2. A valve operating device in accordance with claim 1, characterized in that the two flexible pipe-sections are connected to the same closed tubular member and disposed in the line of extension of each other.

3. A valve operating device in accordance with claim 1, characterized in that the two flexible pipe-sections are disposed side by side parallel to the axis of the valve plug and each associated with a closed tubular member which is rigidly fixed to an operating fork.

4. A valve operating device in accordance with claim 1, characterized in that the flexible pipe-sections are formed of a reinforced synthesis elastomer material in the form of a thin-walled flexible tubular element which is capable of withstanding high pressures.

5. A valve operating device in accordance with claim 1, characterized in that the operating fork is provided with an elongated slot into which a pin is adapted to penetrate, said pin being integral with the lever which is coupled to the valve plug.

6. A valve operating device in accordance with claim 1, characterized in that the tubular member is guided in its rotational motion by a ring which is rigidly fixed to the stationary support.

References Cited

UNITED STATES PATENTS 1,500,052    7/1924    Cauffield et al.
3,233,623    2/1966    Gray.

ARNOLD ROSENTHAL, Primary Examiner

U.S. Cl. X.R.

92—92; 251—59